United States Patent [19]

Morris

[11] Patent Number: 5,743,205
[45] Date of Patent: Apr. 28, 1998

[54] FLOATING DOCK ELEMENT

[76] Inventor: Richard D. Morris, 1440 Poinciana Ave., Ft. Myers, Fla. 33901

[21] Appl. No.: 388,551

[22] Filed: Feb. 14, 1995

Related U.S. Application Data

[63] Continuation-in-part of Ser. No. 167,062, Dec. 16, 1993, Pat. No. 5,421,282.

[51] Int. Cl.$^6$ ................................................ B63B 35/035
[52] U.S. Cl. ........................................ 114/266; 114/267
[58] Field of Search ................................ 114/259, 260, 114/263, 264, 265, 267

[56] References Cited

U.S. PATENT DOCUMENTS

| | | | |
|---|---|---|---|
| 1,908,714 | 5/1933 | Schneider | 114/264 |
| 3,193,855 | 7/1965 | Chapman | 114/267 |
| 3,276,209 | 10/1966 | Mosdell | 114/265 |
| 3,426,109 | 2/1969 | Dempster | 114/267 |
| 3,777,689 | 12/1973 | Olsen et al. | 114/267 |
| 4,768,456 | 9/1988 | Jones et al. | 114/267 |
| 4,887,654 | 12/1989 | Rytand . | |
| 4,988,317 | 1/1991 | Rubinsack . | |
| 5,050,524 | 9/1991 | Kyhl et al. | 114/267 |
| 5,081,946 | 1/1992 | Nannig et al. . | |
| 5,125,355 | 6/1992 | Stranzinger . | |
| 5,199,370 | 4/1993 | Berquist | 114/267 |
| 5,199,371 | 4/1993 | Meriwether . | |
| 5,215,027 | 6/1993 | Baxter . | |
| 5,235,929 | 8/1993 | Chester et al. . | |
| 5,355,825 | 10/1994 | Lefebvre et al. | 114/267 |

*Primary Examiner*—Stephen Avila

[57] ABSTRACT

A floating dock made from a plurality of float elements and the float elements. Each float element is hollow and open to the water on the bottom. On the top of each float element are slots for attaching beams from which to construct the dock. These slots may be at different levels to allow the beams to cross in different planes. The float elements also have flanges at their bottom edges which provide an additional means of connection between elements.

4 Claims, 5 Drawing Sheets

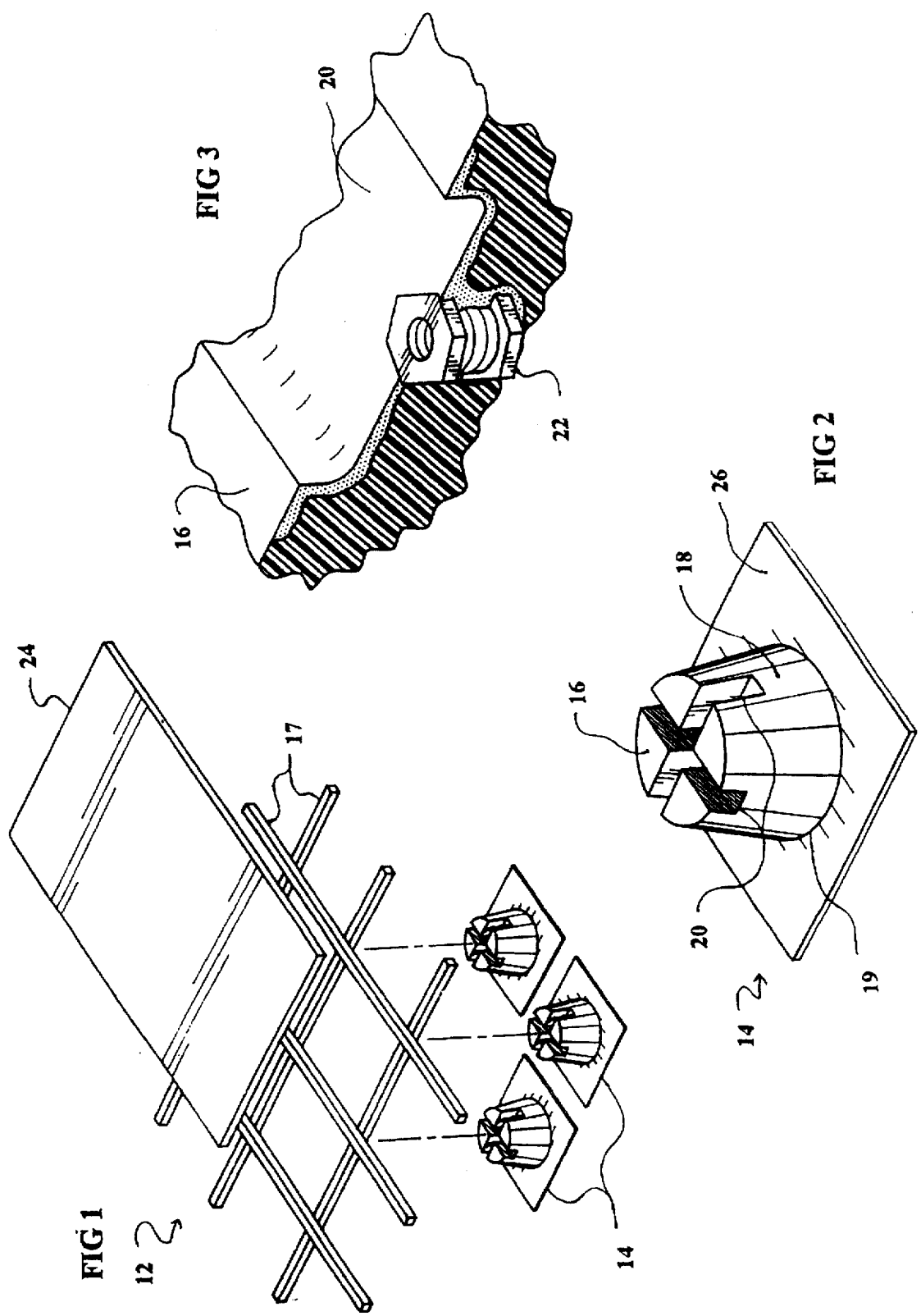

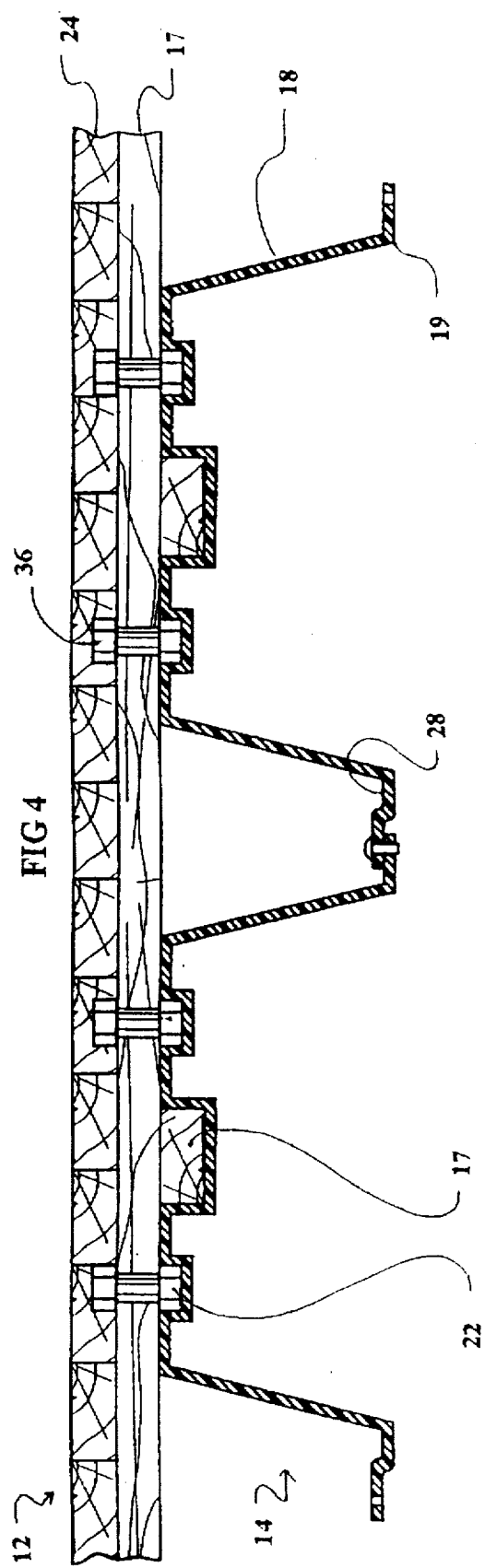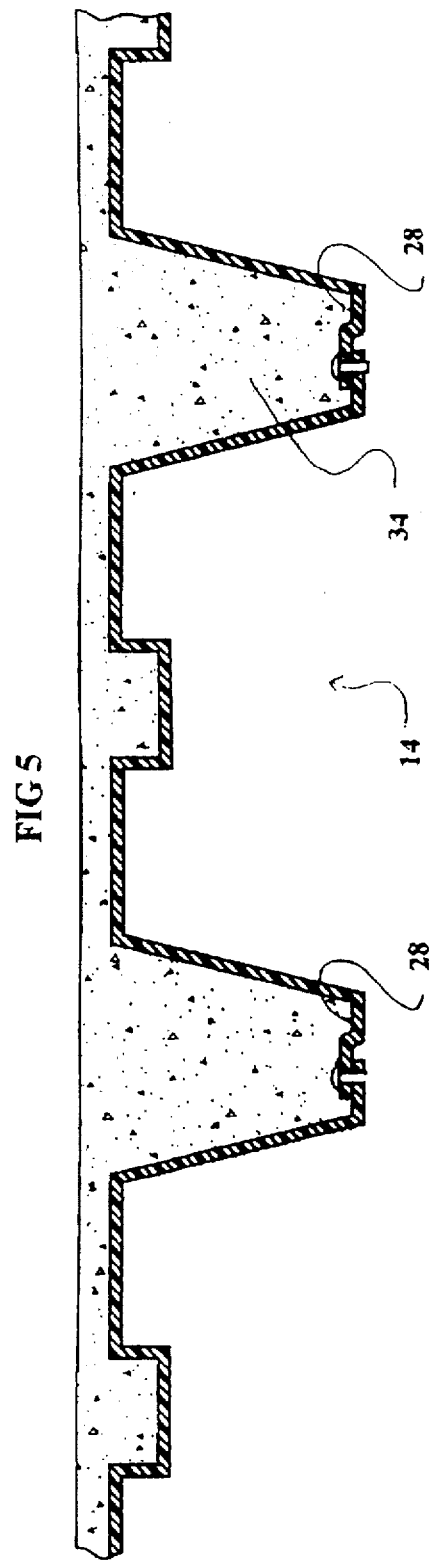

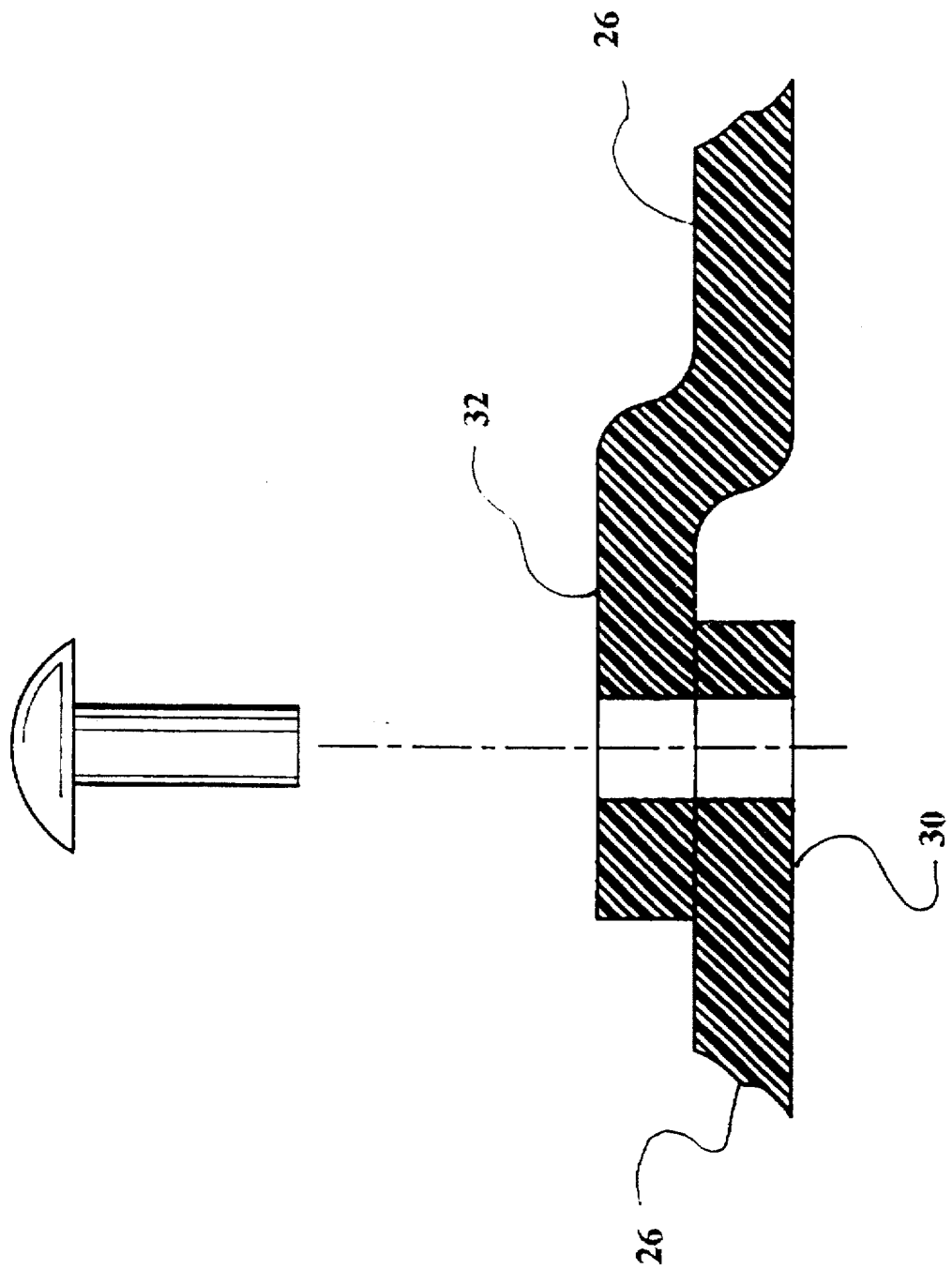

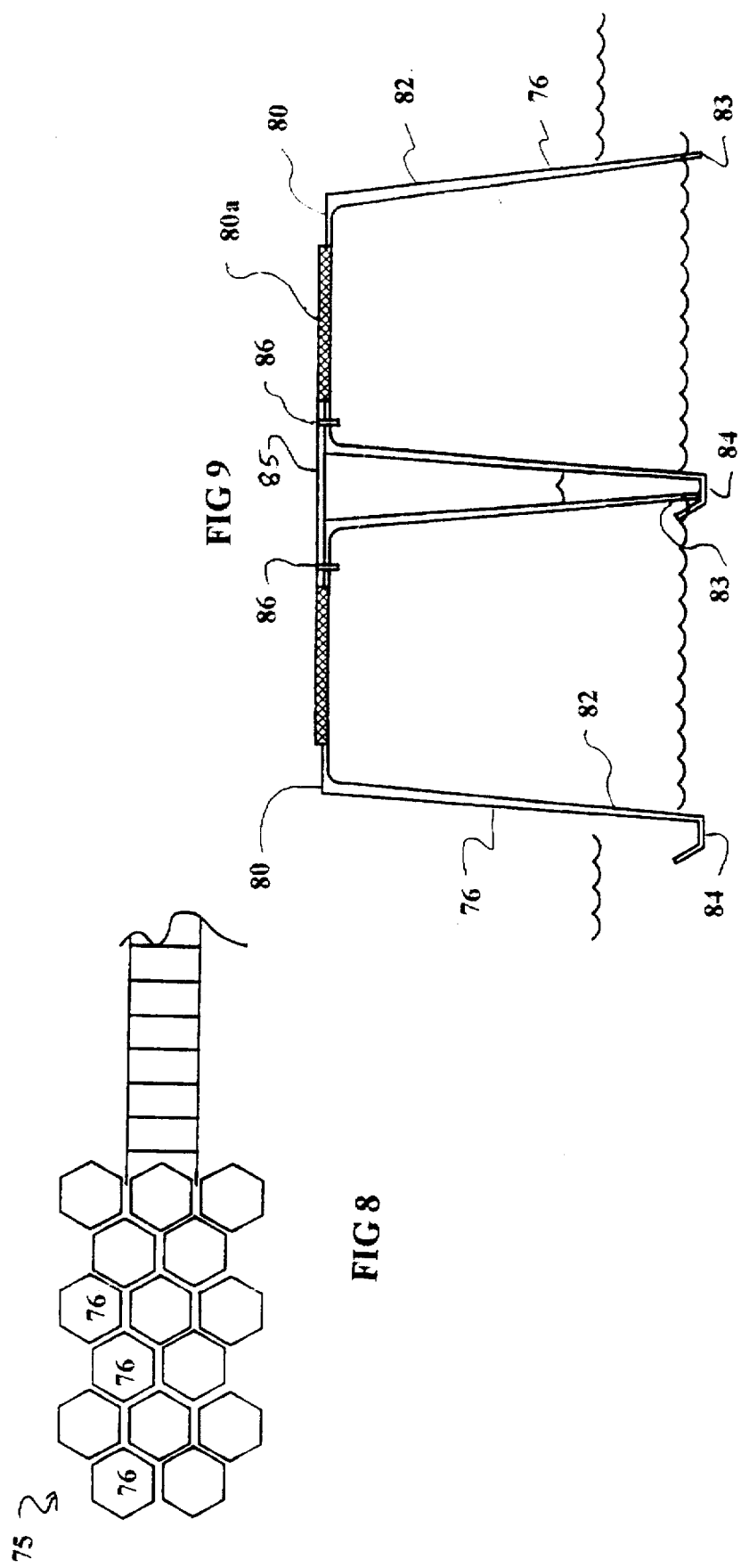

FLOATING DOCK ELEMENT

CROSS-REFERENCE TO RELATED APPLICATION

This application is a continuation-in-part of application Ser. No. 08/167,062, filed Dec. 16, 1993 now U.S. Pat. No. 5,421,282.

BACKGROUND OF THE INVENTION

1. Field of the Invention

The present invention relates generally to buoyant shells or modules, more specifically to a plurality of interconnected inverted, substantially airtight floating shells located in a body of water to form a platform for the construction of various superstructures thereon, and which may be used to form various structures ranging from relatively small docks to relatively large offshore metropolitan areas.

2. Description of the Prior Art

It is advantageous to use, over bodies of water, floating platforms as docks and other structures. In constructing floating platforms it is known to use individual floats to buoy a platform. Although most of the known floating dock arrangements use enclosed floats which may be filled with a buoyant material such as foam, it is known to use floats which are open to the water.

U.S. Pat. No. 4,887,654 issued to David H. Rytand on Dec. 19, 1989 discloses a floating dock where the float modules are completely enclosed and are filled with buoyant foam material.

U.S. Pat. No. 4,988,317 issued to Gilbert A. Rubinsack on Jan. 29, 1991 discloses a pontoon float using a plurality of hollow floats which are closed on the bottom.

U.S. Pat. No. 5,081,946 issued to Urban and Douglas Nannig on Jan. 21, 1992 discloses a floating dock which again has float modules made from a buoyant foam material.

U.S. Pat. No. 5,125,355 issued to Hermann Stranzinger on Jun. 30, 1992 discloses a float. A dock composed of the floats disclosed by Stranzinger has no substantially rigid top surface. In addition the dock must be made of unbroken layer of adjacent floats in a predetermined pattern.

U.S. Pat. No. 5,199,371 issued to Jon D. Meriwether on Apr. 6, 1993 discloses a floating dock using enclosed float drums as floats.

U.S. Pat. No. 5,215,027 issued to Hal T. Baxter on Jun. 1, 1993 discloses a floating dock using flotation modules made from buoyant foam.

U.S. Pat. No. 5,235,929 issued to Barbra A. Chester et al. on Aug. 17, 1993 discloses a floating dock using a plurality of upturned bottles as the flotation modules the bottles. The bottles are held together in a predetermined pattern by tension in a frame.

None of the above patents, taken either singly or in combination, is seen to describe the instant invention as claimed.

SUMMARY OF THE INVENTION

According to the present invention, a float is provided from which a variety of configurations of floating platforms can be constructed in a durable and economic manner. A floating dock according to the invention is formed from a plurality of hollow dock elements. Each module includes a top surface and sidewalls for trapping air to provide buoyancy for the floating structure. Provided on the top surface is a convenient means for connecting a plurality of modules in a variety of patterns to form floating structures.

The instant invention provides floating elements used to buoy floating structures which are open on the bottom and so have excellent properties for supporting floating structures, such properties including stability in the water, flexibility, and nestability for ease of shipping and storage. Also provided by the invention are means to easily attach common building materials such as wood beams to the floating elements to facilitate the construction of a variety of floating structures. The invention also provides a floating element which may be attached to similar elements in a dense, relatively rigid fashion through the use of flanges for the retention of soil or may be used in more sparse configurations where less buoyancy and more flexibility are desired.

Accordingly, it is an object of the invention to provide an economical float to buoy various floating structures.

It is another object of the invention to provide a float with a convenient means for attaching an economical structure made from readily available materials for use as a platform for the construction of docks, boatlifts, and other structures.

It is a further object of the invention to provide a float that may be used in a variety different applications and thus may be used in variety of configurations and may have multiple means of connection.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is an exploded perspective view of floating dock according to the invention.

FIG. 2 is a perspective view of a single dock element;

FIG. 3 is a detail perspective view of a nut insert;

FIG. 4 is a section of the dock of FIG. 1;

FIG. 5 is a section of an alternate embodiment of the dock;

FIG. 6 is a detail of an arrangement for attaching adjacent bottom flanges together;

FIG. 8 is a plan view of the attached floating dock modules of an alternate embodiment; and FIG. 9 is a sectional view of adjacent dock modules of FIG. 8.

Similar reference characters denote corresponding features consistently throughout the attached drawings.

DETAILED DESCRIPTION OF THE PREFERRED EMBODIMENTS

Figure 7:
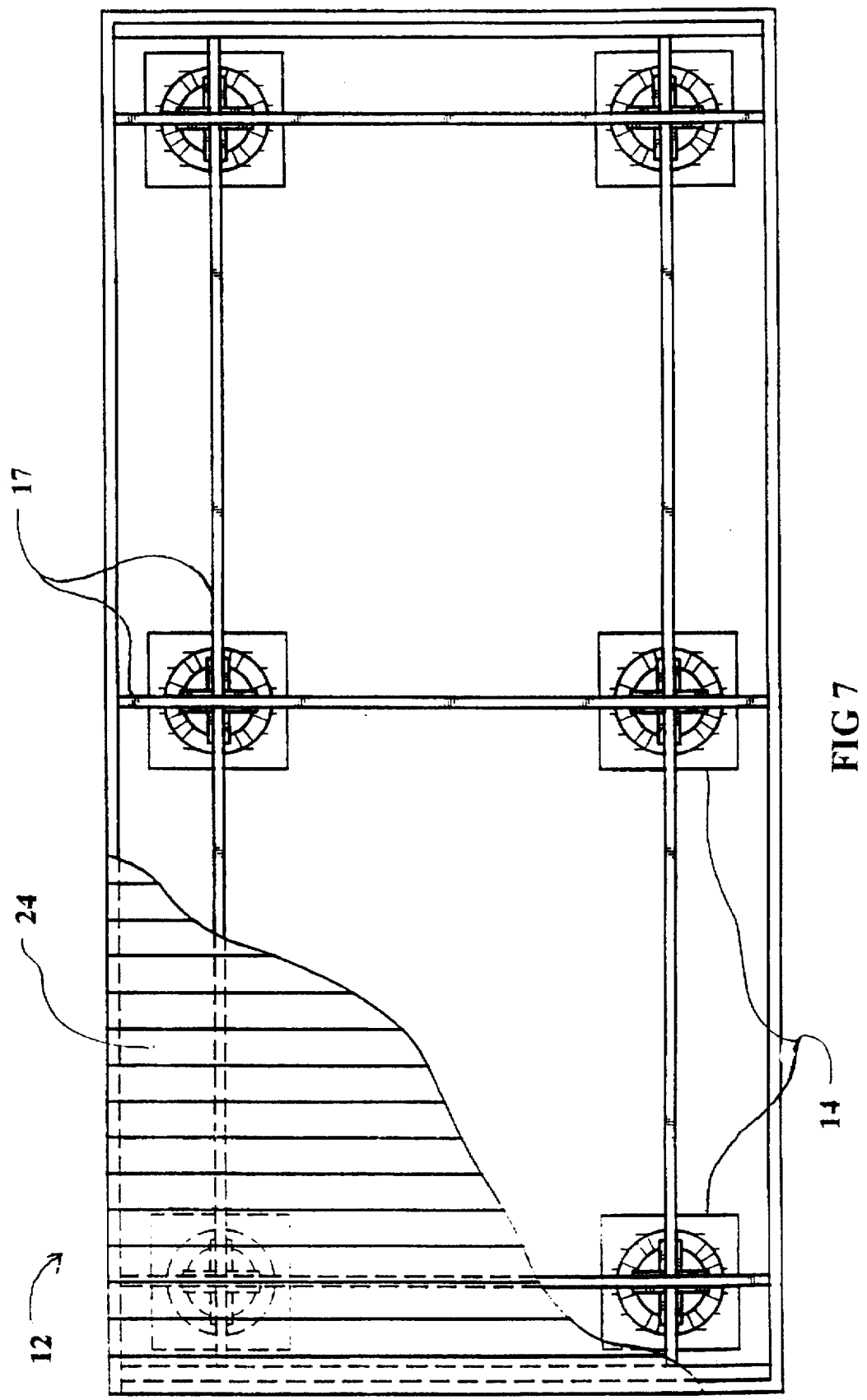
FIG. 7 is a top view of an alternate arrangement of dock elements.

As can be seen by reference to the drawings, in particular to FIGS. 1 and 2, a floating dock according to the present invention is designated 12. The floating dock 12 is comprised of hollow dock elements 14 connected to a supporting lattice formed from beams 17. The hollow dock element 14 is the basic unit from which structures are made according to the present invention. Each dock element 14 has a top surface 16 and sidewalls 18 which depend from the top surface 16 and end at bottom edges 19, as shown in FIG. 2. Each dock element 14 is open at the bottom so that the top surface 16 and sidewalls 18 together with the surface of the body of water on which the dock is situated form an air pocket which provides buoyancy to the dock 12. The floating dock elements may be formed, as shown, with tapered sidewalls 18 such that the top surface 16 is smaller than the shape the bottom edges 19 of the sidewalls 18 define. This tapering allows the dock elements to be nested within each other when not in use and for shipping convenience. The dock elements, as shown, are basically cylindrical as this shape best distributes the loads and pressures involved and provides an efficient shape to float on water. The dock element may also be hexagonal as shown in FIG. 8 as this shape provides for ease of connection of adjacent dock elements. The dock elements 14 may be made of a lightweight durable material such as polyethylene.

In the top of each dock element 14 are formed one or more beam slots 20 as shown in FIG. 2. The beam slots 20 are molded into the top surface 16 in manner which does not compromise the airtight integrity of the top surface 16. The beam slots are shaped to receive the beams 17 and to reinforce the top surface 16. A beam slot 20 may extend entirely across a diameter of the top surface 16 to allow the midspan of a beam 17 to fit into a beam slot 20. A beam slot may also be shaped such that the top surface of a beam 17 lays in the same plane as top surface 16. Multiple beam slots on a single dock element may be oriented in different directions and may be at a single level or at multiple levels, as shown in FIG. 2, to allow intersecting beams 17 to cross in different planes. Useful configurations of beam slots 20 include two slots crossing at right angles at the center of the top surface 16, as shown, and three slots crossing at the center of top surface 16 forming 60 degree angles.

In the beam slots 20 are nut inserts 22 shown in FIG. 3. The nut inserts are made of a hard material such as stainless steel which may be threaded to receive bolts 36 which connect the beams 17 to the dock elements 14. The nut inserts are rotationally molded into the top of the dock element so that the air tight integrity of the dock element is maintained. The top of the nut inserts are flush with the surface of the beam pocket and are surrounded on the bottom by the material from which the dock element is constructed, as shown in FIG. 3. Thus, the nut insert is a fixed integral part of the dock element 14 which provides a means of attachment to the beams 17.

Returning to FIG. 1, a lattice of beams lays in beam slots 20 and is bolted to nut inserts 22. This structure of beams, using primarily the dock elements 14 for its interconnection, is the foundation on which a wide variety of floating structures may be constructed. Using dock elements 14 as the primary connection means between beams 17 minimizes the need for additional elements and materials in constructing floating structures and allows for great flexibility in designing floating structures. The dock 12 shown in FIG. 1 is constructed from a lattice of beams 17 connecting a plurality of dock elements 14 in a dense pattern allowing the dock to support a large amount of weight. A deck 24 is attached on top of the lattice of beams 17. The lattice may be constructed of common 2×4 wood beams oriented with the larger side parallel to the top surface 16 of the dock elements to give the dock desired flexibility. This flexibility is important as it allows the use of the same size of beams in constructing floating structures of any size. Without this flexibility, when designing a rigid structure one must increase the size of the beams as the size of the structure is increased to avoid the destruction of the structure by the action of waves. The design of the dock elements 14 allows for many different configurations of dock elements 14 to be easily constructed for a variety of applications. An alternate configuration of dock elements is the sparser pattern shown in FIG. 7 which is lighter and less expensive to construct than the configuration shown in FIG. 1.

Another feature of the dock elements 14 of the present invention which allows for great versatility in constructing floating structures are the flanges 26 which extend from sidewalls 18 as shown in FIG. 2. The flanges 26 are shaped so that they abut similar flanges on adjacent dock elements. Useful shapes formed by the flanges 26 include squares and hexagons which when placed in close proximity to each other form a continuous surface in all directions without gaps. Thus, when all flanges 26 on each dock element 14 which form dock 12 abut adjacent flanges, a continuous floor surface 28 between the sidewalls of adjacent dock elements may be formed as shown in FIG. 4. This configuration with all flanges extending from a dock element 14 abutting adjacent flanges provides for an alternate connection means between dock elements 14 where the flanges abut. The flanges 26 may be alternately formed with male straight portions 30 and female raised portions 32, as shown in FIG. 6, so that opposite flanges may overlap and be connected by a fastening means such as bolts, rivets or welds. The flanges may also be joined by a separate joining member fastened to both adjoining flanges. A common 2×4 wood beam may be used as the joining member. A more rigid structure may be formed when the dock elements 14 are connected by beams 17 bolted in beam slots 20 and by the connection of adjacent flanges 26 as shown in FIG. 4. Connecting the flanges 26 also provides the option of constructing a floating dock with or without beams 17. In a particularly useful version the alternative without beams, a filling 34 is disposed between the sidewalls 18 and on the continuous floor surface 28 formed by adjacent abutting flanges 26 as shown in FIG. 5. The filling may provide additional means to hold the dock elements 14 together and may be used to form a top surface of the dock in place of a deck. Useful fillings may include soil and concrete.

An alternate embodiment of the floating dock 75 of the present invention is shown in FIG. 8. It is formed from one or more hollow dock elements 76 as shown FIG. 9. Each element 76 of the floating dock may be constructed of a lightweight material such as plastic.

Each of the floating dock elements may include a platform 80 with tapered sidewalls 82 extending downward for immersion into the water. The illustrated floating dock elements are hexagonal, but may be of any polygonal shape. It is advantageous to configure the dock elements as hexagonal shapes for ease of connection and sufficient solidity to the otherwise flexible island.

Adjoining dock elements may be connected along the platform 80 and the bottom of the sidewalls 82. The elements may be connected at the top by a plastic connection plate 85 which spans the modules. The plate may be fastened to the modules with stainless steel fasteners or pins 86. The connection plate 85 facilitates travel from one module to another.

The modules are connected at the bottom of the sidewalls by placing a male straight portion 83 attached to a sidewall 82 into a female lip 84 of an adjacent sidewall 82. The male and female members 83,84 are alternately attachments to the sidewalls of a module. A plate 80a of composite material may be affixed to the platform 80. A nonslip skin may be applied to the composite platform 80a and the connection plate 85 to minimize the chances of a person slipping or falling when moving from one module to another.

In another alternative embodiment (not shown), a floating dock may also be constructed by attaching the bottoms of containers, such as trash cans, to a wood deck. It is understood that the present invention is not limited to the embodiments described above, but encompasses any and all embodiments within the scope of the following claims.

I claim:

1. A floatation element comprising: a hollow open bottom container having, a top surface and sidewalls depending from said top surface which end at the bottom edges meant to be immersed in a body of water such that said top surface said side walls and a surface of the body of water define an air pocket, whereby said top is smaller than said bottom providing a nesting means for its copy, and said top surface contains an means for bolting a structure to said top surface and said side walls have a flange extending from the open end, providing for increased strength.

2. A float according to claim 1 further comprising:
one or more beam slots formed in said top surface of said dock element.

3. A float according to claim 2 wherein:
said flanges are shaped in a manner such that such that when a plurality of said floatation elements are placed in proximity to each other said flanges may abut to connectivity form a continuous floor surface between said sidewalls.

4. A float according to claim 3 wherein:
a filling disposed on said continuous floor surface between said sidewalls.

* * * * *